United States Patent
Stukey et al.

(10) Patent No.: US 7,638,213 B2
(45) Date of Patent: Dec. 29, 2009

(54) MULTI-STAGE RAPID VAPORIZATION APPARATUS AND METHOD

(75) Inventors: Kevin Stukey, East Amherst, NY (US); William H. Pettit, Rochester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 482 days.

(21) Appl. No.: 11/117,791

(22) Filed: Apr. 29, 2005

(65) Prior Publication Data

US 2007/0015020 A1 Jan. 18, 2007

Related U.S. Application Data

(62) Division of application No. 10/132,977, filed on Apr. 26, 2002, now Pat. No. 6,896,986.

(51) Int. Cl.
*H01M 8/04* (2006.01)

(52) U.S. Cl. .............................. 429/13; 429/17; 422/198

(58) Field of Classification Search ............ 222/153.14, 222/556, 198; 429/12, 26, 13, 17, 34
See application file for complete search history.

(56) References Cited

U.S. PATENT DOCUMENTS

| | | | |
|---|---|---|---|
| 4,650,727 A | 3/1987 | Vanderborgh et al. | |
| 5,130,099 A * | 7/1992 | Schatz | 422/175 |
| 5,271,916 A | 12/1993 | Vanderborgh et al. | |
| 5,316,871 A | 5/1994 | Swathirajan et al. | |
| 5,637,415 A | 6/1997 | Meltser et al. | |
| 6,132,689 A | 10/2000 | Skala et al. | |
| 6,241,953 B1 | 6/2001 | Krijgsman | 422/297 |
| 2001/0014301 A1 * | 8/2001 | Nakamura et al. | 422/198 |
| 2003/0138681 A1 | 7/2003 | Boneberg et al. | 429/20 |

* cited by examiner

*Primary Examiner*—Patrick Ryan
*Assistant Examiner*—Monique Wills

(57) ABSTRACT

A vaporizer is provided for vaporizing liquid in a fluid stream. The vaporizer includes at least two heat exchangers serially arranged in a direction of flow of the fluid stream through the vaporizer for vaporizing liquid in the fluid stream in stages. The heat exchangers each comprise a first plurality of thermally conductive flow channels through which the fluid stream flows and a second plurality of thermally conductive flow channels through which a heating stream flows and which are in heat exchange relationship with the first plurality of thermally conductive flow channels. A liquid supply means is provided for adding liquid to a downstream heat exchanger. The added liquid mixes with the vaporized stream exiting an upstream heat exchanger for vaporization in the downstream heat exchanger.

3 Claims, 6 Drawing Sheets

MULTI-STAGE RAPID VAPORIZATION APPARATUS AND METHOD

U.S. application Ser. No. 11/117,791, filed Apr. 29, 2005 is a division of U.S. application Ser. No. 10/132,977 filed Apr. 26, 2002, now U.S. Pat. No. 6896,986.

FIELD OF THE INVENTION

The present invention relates to vaporizers for fuel cell systems and more particularly to an improved vaporizer.

BACKGROUND OF THE INVENTION

Fuel cell systems have been proposed as power sources for a varying number of applications, including mobile, vehicular applications. Generally, the fuel cell system includes a fuel cell stack that uses hydrogen to produce an electrical current for powering an external device. The hydrogen may be supplied to the fuel cell stack directly from a hydrogen source. An alternative to hydrogen storage onboard a vehicle is reformate generated from a hydrocarbon fuel. To this end, an auto-thermal reformer is implemented for reforming the hydrocarbon fuel to produce a reformate stream having a hydrogen component. Reformation of the fuel within the auto-thermal reformer requires a mixture of fuel and water in a gaseous state (i.e. vaporized fuel and steam). To achieve the gaseous state, heat transfer (or surface-type) vaporizers are provided immediately prior to the auto-thermal reformer for vaporizing the water and in some cases the fuel.

Typical surface-type vaporizers function by pooling fluid on or around a heat transfer surface. Pooling of fluid, however, entails an aggregation of fluid resulting in a slow transient response between pool formation and vaporization. Fuel cell applications, in particular vehicular applications, are characterized by transient power requirements for acceleration. These transient power demands require fast fluid vaporization for supplying vaporized liquids to reaction vessels for reforming the hydrocarbon fuel.

One means of overcoming this problem is to employ volume, or direct spray vaporizers. Such devices, however, are cumbersome and require high grade heat, leading to reduced system thermal efficiency.

Therefore, it is desirable in the industry to provide an improved surface-type vaporizer and vaporization method overcoming the disadvantages associated with traditional surface-type vaporizers. In particular, the improved vaporizer should decrease the transient response time for fluid vaporization for meeting system power demands.

SUMMARY OF THE INVENTION

The present invention provides a vaporizer for vaporizing liquid in a fluid stream. The vaporizer includes at least two heat exchangers serially arranged in a direction of flow of the fluid stream through the vaporizer for vaporizing liquid in the fluid stream in stages. The heat exchangers each comprise at least one first flow channel through which the fluid stream flows and at least one second channel which includes heating means. Preferably the heating means in the second channel comprise a heating medium which flows through the second channel. Preferably, each heat exchanger comprises a first plurality of thermally conductive flow channels through which the fluid stream flows and a second plurality of thermally conductive flow channels which contain heating means and preferably contain a heating medium flowing through such second plurality of channels. In an alternative embodiment, the heating means comprises resistive heating elements. The first and second flow channels are separate from one another and are in heat exchange relationship with one another. A liquid supply means adds liquid to a downstream heat exchanger of the at least two heat exchangers. The added liquid is mixed with the vaporized fluid stream exiting the upstream heat exchanger for vaporization of the added liquid in the downstream heat exchanger. In one embodiment, the heating medium is provided by preferential oxidization of carbon monoxide with oxygen in a hydrocarbon reformate stream.

In accordance with a method of the present invention, a liquid is vaporized in stages in the heat exchangers of the vaporizer. Additional liquid is injected between stages so that the vapor produced upstream functions to disperse or distribute the injected liquid over internal heat transfer surfaces of the downstream heat exchanger. In one embodiment, the liquid being vaporized is; water and in another embodiment the liquid being vaporized is a hydrocarbon fuel. The vaporized water (steam) and the vaporized hydrocarbon fuel are supplied to a reactor within the fuel cell system. The reactor is typically a reformer.

The vaporizer is arranged to provide heat transfer to a fluid stream in stages. The vaporizer illustrated herein is arranged with multiple sections so that fluid is injected into a downstream section for dispersing in a carrier supplied from an upstream section. The vaporizer may be monolithic and contain several heat exchange sections fabricated along a single heat exchanger core. Alternatively, it may be arranged as separate heat exchangers, with separate cores, each core corresponding to a separate heat exchange stage.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
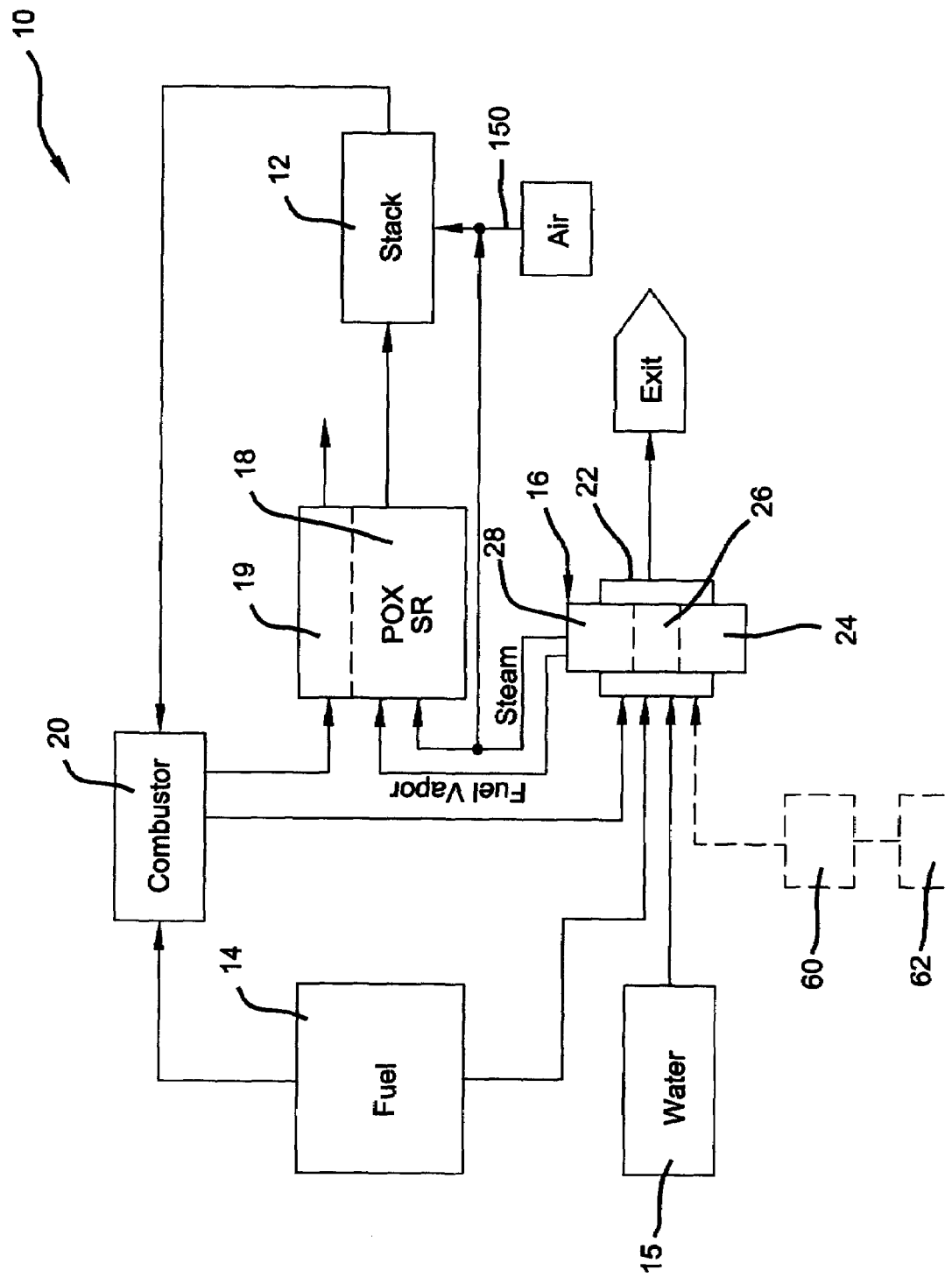
FIG. 1 is a schematic view of an exemplary fuel cell system including a multi-stage rapid vaporization apparatus in accordance with the principles of the present invention.

With reference to FIG. 1, an exemplary fuel cell system 10 is shown for converting a hydrocarbon, such as gasoline, into a hydrogen-rich stream. In general, the fuel cell system 10 converts the hydrocarbon fuel source into the hydrogen-rich stream through a series of reactions, adding selective volumes of air and steam. The resultant hydrogen-rich stream is supplied to a fuel cell stack 12 for producing an electric current to power an external electric mechanism, such as an electric motor (not shown).

The fuel cell system 10 includes a fuel tank 14 that supplies the hydrocarbon fuel and a water tank 15 is provided for supplying water. The hydrocarbon fuel is supplied from the fuel tank 14 to a vaporizer 16 and a combustor 20. As discussed in further detail below, the auto-thermal reformer 18 enables catalytic reformation of the hydrocarbon fuel to the hydrogen-rich stream during normal operation of the fuel cell system 10, after the start-up period. In one embodiment, reformer 18 is heated indirectly by combustor 20 via heat exchanger 19. The system may further comprise one or more reactors such as water gas shift (WGS) and preferential oxidizer (PrOx) between reformer 18 and stack 12. The vaporizer 16 enables rapid vaporization of one of, but preferably both the hydrocarbon fuel and water for introduction into the fuel cell system 10 in a gaseous state.

Figure 2:
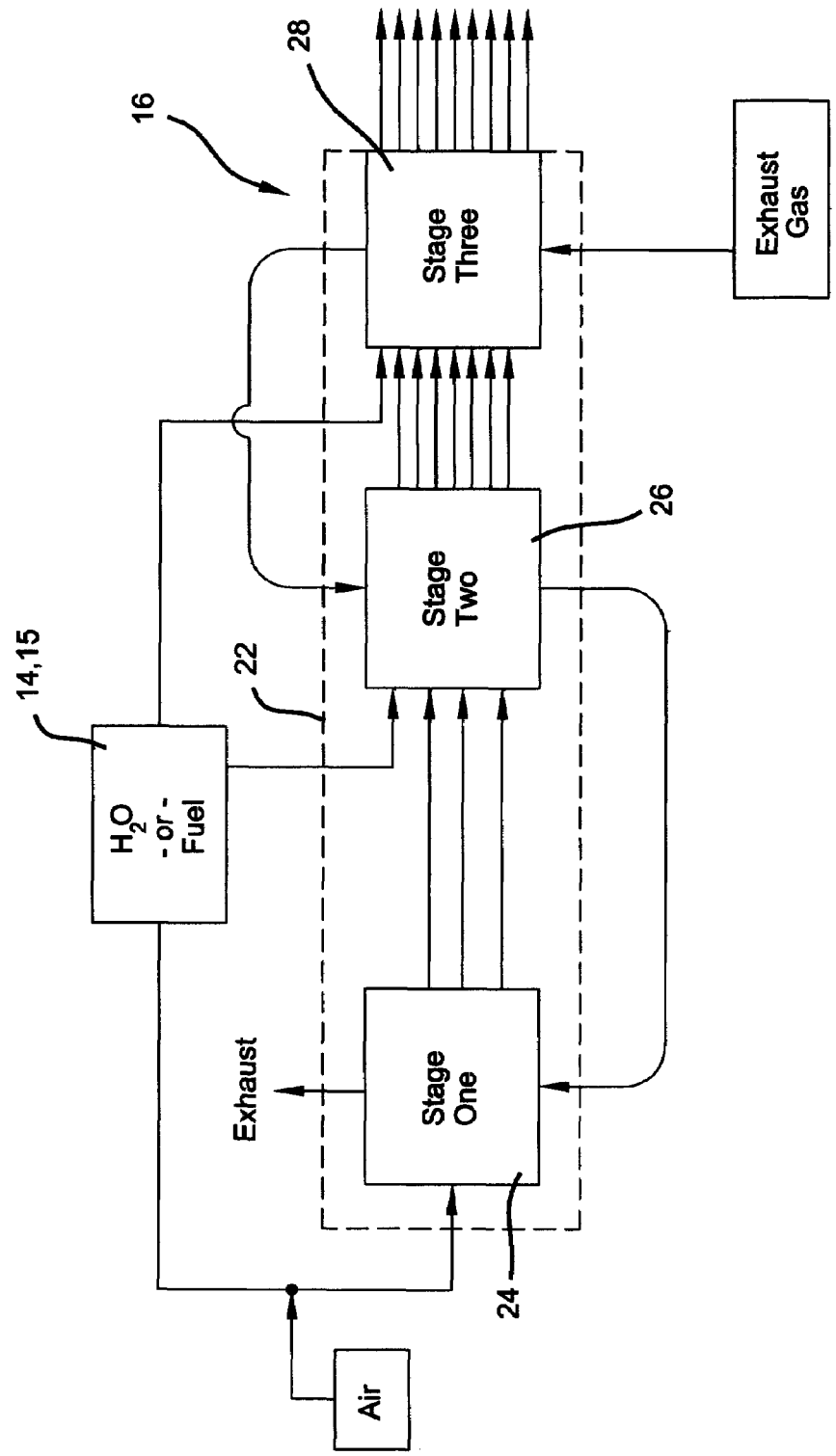
FIG. 2 is a schematic view of the multi-stage rapid vaporization apparatus.

The vaporizer 16 is a multi-stage vaporizer for enabling rapid vaporization of the hydrocarbon fuel and water. With particular reference to FIGS. 1 and 2, the vaporizer 16 of the exemplary embodiment includes: a manifold 22 in fluid communication with three heat exchange stages, identified as one, two and three 24, 26, 28, respectively. It will be appreciated that more or fewer stages may be included as design requirements dictate. The manifold 22 is in fluid communication with the fuel and water tanks 14, 15 and the combustor 20. The manifold 22 directs a flow of hot gas from the combustor 20 and a flow of a liquid (fuel or water) from the fuel and water tanks 14, 15 through the heat exchange stages 24, 26, 28 of the vaporizer 16. Although the exemplary embodiment of the present invention provides heating of the vaporizer 16 via the combustor 20, it is anticipated that other methods known in the art may be implemented for heating the vaporizer 16, including, but not limited to, electric heating, catalytic reaction, heat transfer from other system components and the like.

More particularly, the manifold 22 directs the flow of the liquid to each of the heat exchange stages 24, 26, 28, preferably at varying volumetric flowrates. An output flow of stage one 24 is channeled to stage two 26, an output flow of stage two 26 is channeled to stage three 28 and an output flow of stage three 28 is then provided to the auto-thermal reformer 18. The manifold 22 further enables fluid communication between the combustor 20 and stage three 28 for channeling exhaust gases therethrough. Stage two 26 is in fluid communication with stage three 28, whereby the exhaust gases flowing through stage three 28 are subsequently channeled through stage two 26. Similarly, stage one 24 is in fluid communication with stage two 26, whereby the exhaust gases flowing through stage two 26 are subsequently channeled through stage one 24. The exhaust gases then flow from stage one 24 to an exhaust.

Figure 3:
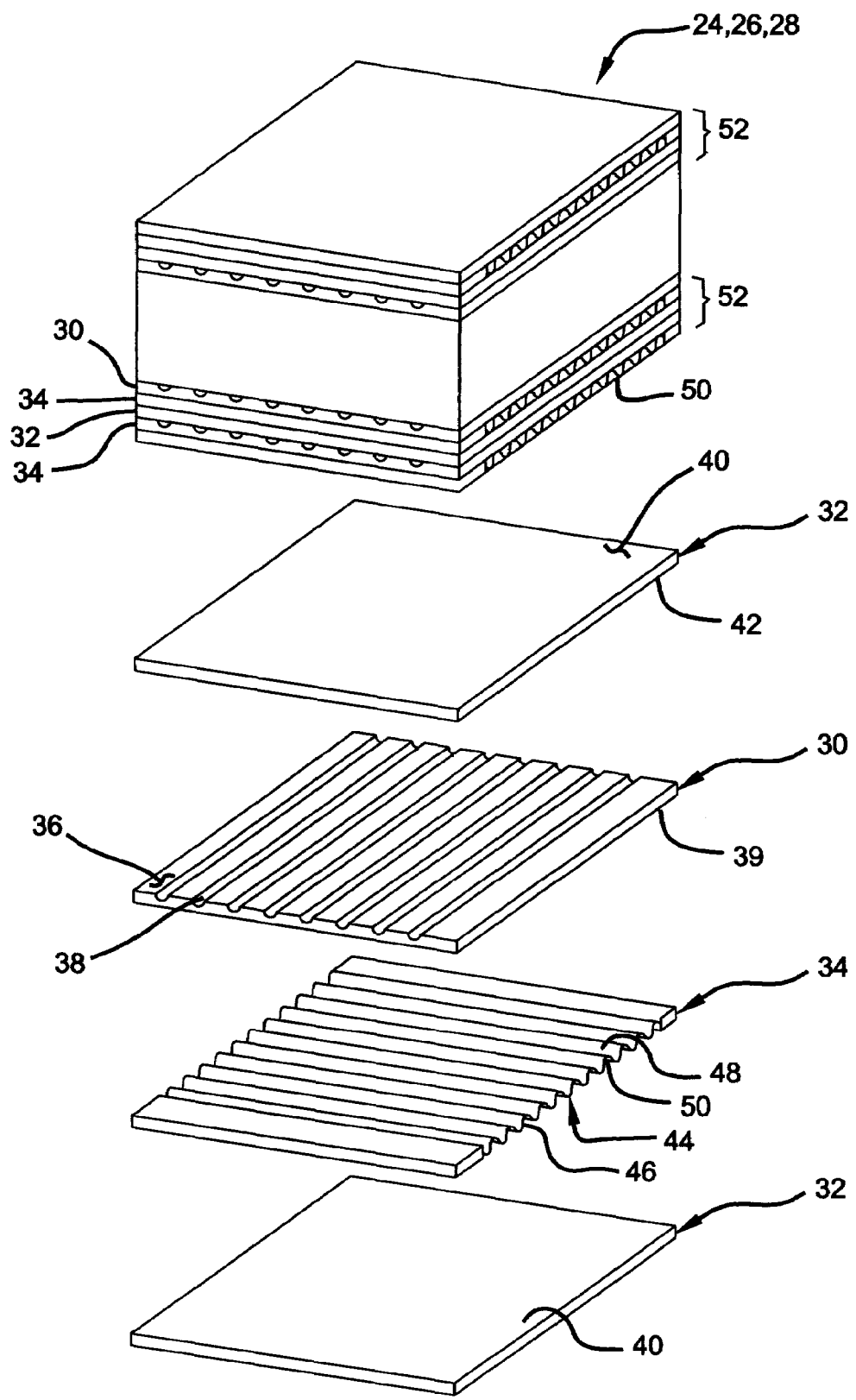
FIG. 3 is a perspective view of a single stage of multi-stage rapid vaporization apparatus of FIG. 2.

With particular reference to FIG. 3, an exemplary construction of the stages 24, 26, 28 will be described in detail. It will be appreciated that the exemplary construction may be varied while remaining within the scope of the present invention. Further, it is anticipated that the heat exchange stages 24, 26, 28 will be of a similar construction, therefore, only a single, exemplary stage, will be described in detail. The stage 24, 26, 28 includes a plurality of layers including grooved plates 30, flat plates 32 and finned plates 34. The grooved plates 30 each include a top surface 36 having a plurality of parallel running grooves 38, or micro-channels formed therein and a flat bottom surface 39. The flat plates 32 each include top and bottom flat surfaces 40, 42. The finned plates 34 each include a central portion 44 having a generally sinusoidal cross-section forming a plurality of fins 46 having upper and lower valleys 48, 50 formed therebetween.

A stage section 52 is defined by a pair of grooved plates 30, between which a flat plate 32 and a finned plate 34 are disposed. More specifically, a first grooved plate 30 has a first flat plate 32 lying adjacent thereto, whereby the bottom surface 42 covers the micro-channels 38 for forming covered channels. A first finned plate 34 lies adjacent the top surface 40 of the first flat plate 32, whereby the top surface 40 covers the lower valleys 50 of the fins 46 forming covered channels. A second grooved plate 30 lies adjacent to the first finned plate 34, whereby the bottom surface 39 of the second grooved plate 30 covers the upper valleys 48 of the first finned plate 34 forming covered channels. The stage sections 52 are repeated for forming the stage 24, 26, 28. It is anticipated that the number of stage sections 52 may vary depending upon the amount of fluid flow required through the particular stage. Further, the exemplary stage provides a generally square shape for the various plates. It is anticipated, however, that the shape of the plates may vary (e.g. rectangular, triangular, circular, etc.) as design requirements dictate.

The heat exchange stage one 24 generally functions to generate an initial "carrier fluid" in vapor form for facilitating subsequent vaporization of injected liquid in stage two 26. Liquid is preferably injected into the outlet stream of stage two 26 for vaporization in stage three 28. Thus, the grooved plates 30 of stage one include the micro-channels 38. In an exemplary embodiment, the grooved plates 30 of stage one 24 are approximately 0.015 inches thick, and the micro-channels 38 have a depth of 0.008 in and a width of 0.012 in with a center-to-center pitch of 0.032 in. The micro-channels 38 are specifically designed to minimize pooling of liquid flowing therethrough. In one embodiment, the grooves 38 formed in the grooved plates of stages two and three 26, 28 are larger than the "micro-channels" 38 of the stage one grooved plates 30 because the initial carrier fluid, discussed below, is formed in stage one. In another embodiment, described later, the fluid from stage one is split and fed into stages two and three. Here it is preferred that the channels of each of the stages be essentially the same size to facilitate fabrication.

The stages 24, 26, 28 are interconnected for fluid communication through the manifold 22, whereby the micro-channels 38 of the stage one grooved plates 30 are in fluid communication with the grooves 38 of the stage two grooved plates 30, which are further in fluid communication with the grooves 38 of the stage three grooved plates 30. Similarly, the fin-formed covered channels of the finned plates 34 of stage one 24 are in fluid communication with the covered channels of the stage two finned plates 34, which are further in fluid communication with the covered channels of the stage; three finned plates 34. It should also be noted that the manifold provides independent fluid communication from the fuel and water tanks 14, 15 to the stages 24, 26, 28.

In one arrangement, a hot medium flows across finned plate 34 to transfer heat to fluid in channels 38. In another arrangement, finned plate 34 is an electric heating element. As can be seen, the heating means between plates 32 and 30 is not limited and takes a variety of forms including catalytic reaction described herein below.

Figure 4:
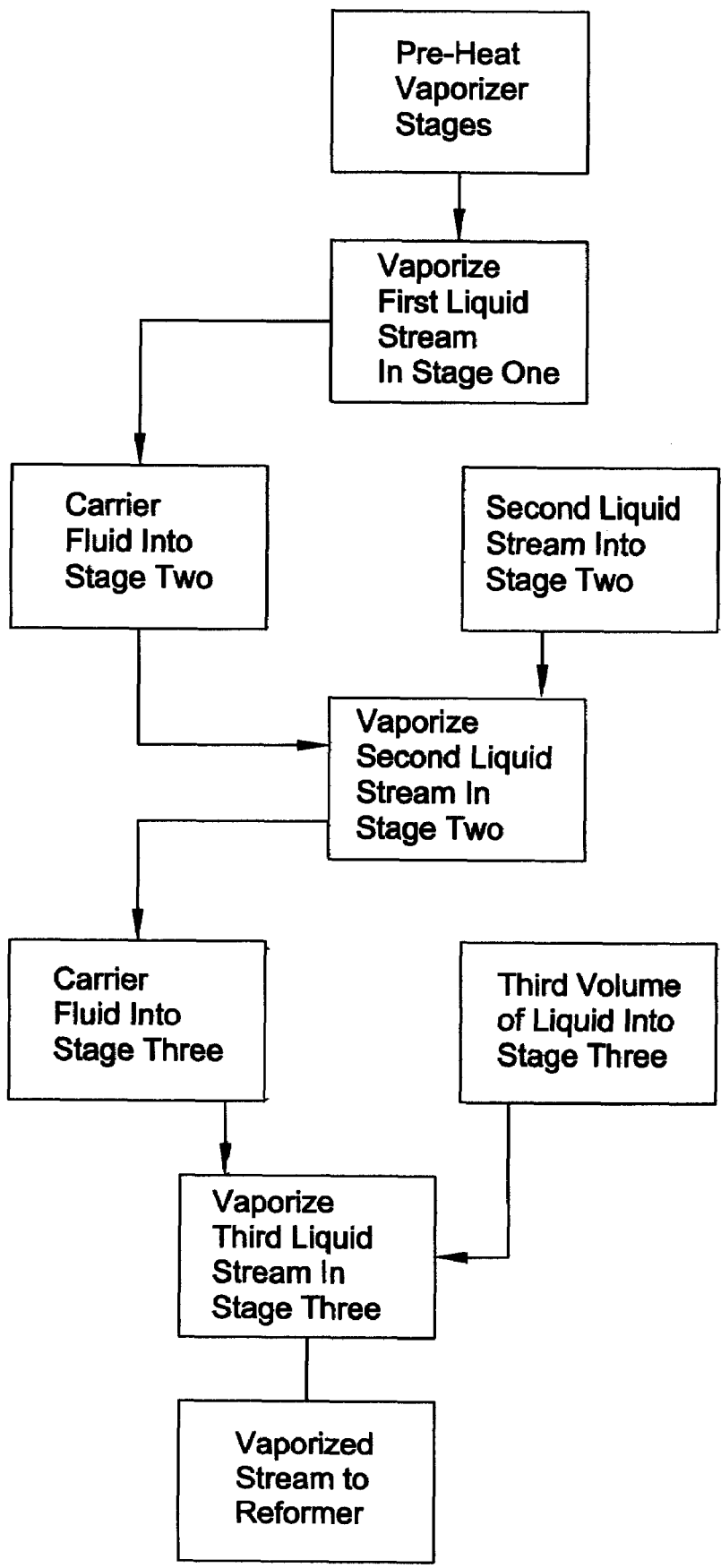
FIG. 4 provides a flowchart detailing a rapid vaporization method in accordance with the principles of the present invention.

With reference to FIG. 4, a flowchart is provided illustrating the vaporization method of the present invention with reference to a heating medium which is hot exhaust gas from the combustor 20. Initially, hot exhaust gases from the combustor 20 flow through the multiple stages 24, 26, 28, in particular the finned plates 34, via the manifold 22. In this manner, the stages 24, 26, 28 are heated by the exhaust gases for vaporizing the flow of liquid through each. A first volume of: liquid flows into the micro-channels 38 of stage one 24 and is vaporized therein as it is in heat exchange relationship with the hot combustion gases, as explained above. The fully or partially vaporized fluid (vapor fraction<=100%) is channeled to stage two 26, now functioning as a carrier fluid. Concurrently, a second volume of liquid is channeled into stage two 26, whereby the vaporized fluid from stage one 24, functioning as a carrier fluid, distributes the second volume of liquid over the heat transfer surface within stage two 26. In this manner, the second volume of liquid is more quickly vaporized, adding to the total volume of vaporized fluid. The increased vaporized fluid (vapor fraction<=100%) is then channeled to stage three 28 with concurrent channeling of a third-volume of liquid thereinto. Again, the vaporized fluid from stage two 26, functioning as a carrier fluid, distributes the third volume of liquid over the surface area within stage three 28, whereby the third volume of liquid is quickly vaporized therein, adding to the overall volume of vaporized fluid. Finally, the vaporized fluid is supplied to the auto-thermal reformer 18 for reformation therein. It should be noted that injection of the second and third volumes of liquid into the subsequent stages may be achieved using techniques including, but not limited to, spraying or wicking through porous media.

It is anticipated that the vaporizer 16 of the present invention may optionally include varying flow rates across the multiple stages 24, 26, 28. In an exemplary embodiment, stage one 24 functions at a fixed flow rate and the remaining stages 26, 28 function at variable flow rates. In other words, the flow rate through stage one 24 is fixed and the flow rates through stages two and three 26, 28 may be independently varied as demand dictates.

It is further anticipated that compressed air be introduced to the individual stages for acting as a carrier gas. To achieve this a compressor 60 is provided for compressing and channeling air flow from an air source 62 into the manifold 22. In this manner, the compressed air flows through the grooved channels 38 for distributing the liquid over a larger surface area therein, thereby enabling quicker vaporization via distribution of liquid to the available surface area.

Figure 5:
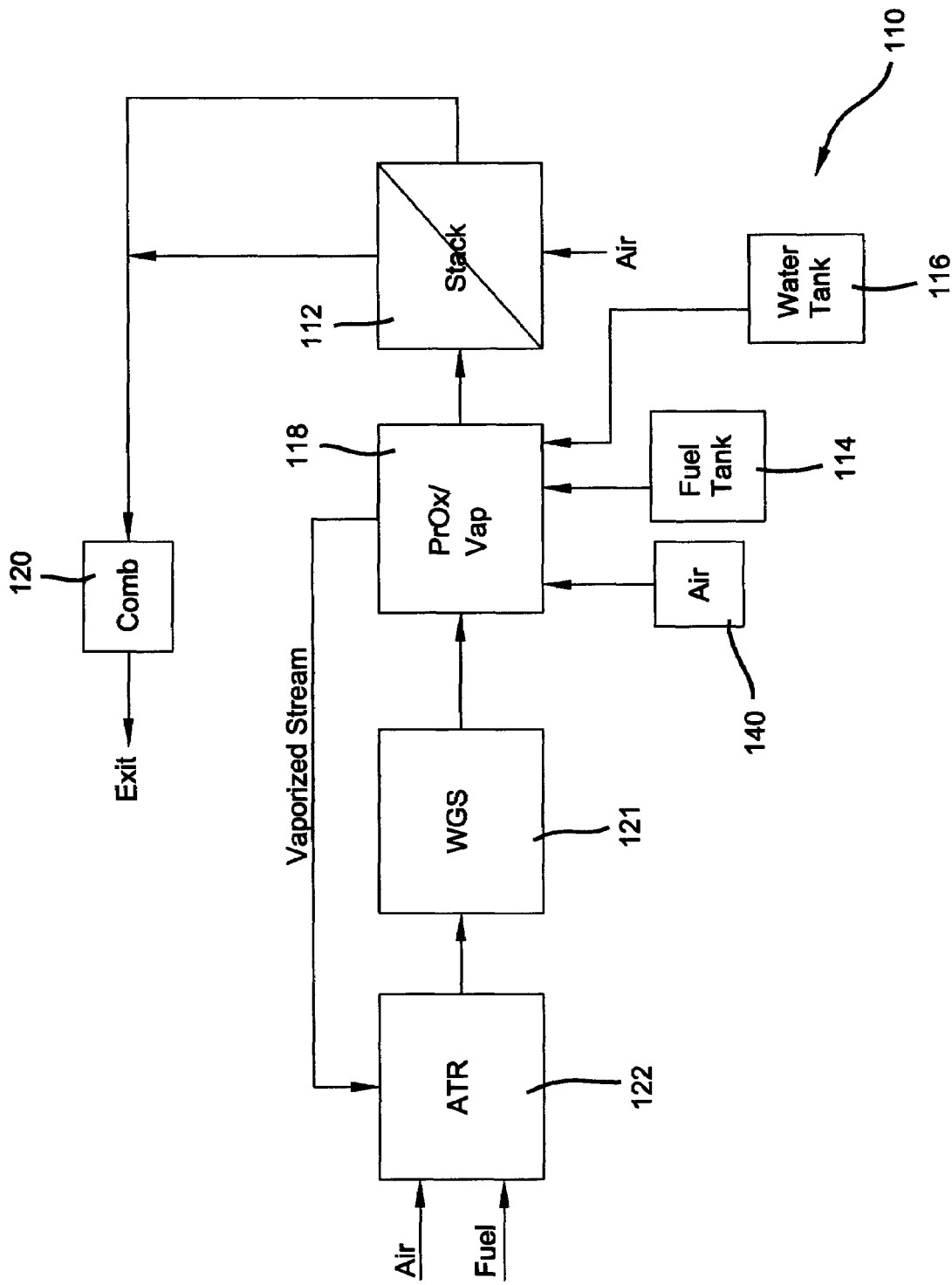
FIG. 5 is a schematic view of an alternative fuel cell system including a combination multi-stage vaporization apparatus and preferential oxidization reactor in accordance with the principles of the present invention.

With reference to FIG. 5, an alternative fuel cell system 110 is shown. The fuel cell system 110 converts a hydrocarbon, such as gasoline, into a hydrogen-rich stream. In general, the fuel cell system 110 converts the hydrocarbon fuel source into the hydrogen-rich stream through a series of reactions, adding selective volumes of air and/or steam. The resultant hydrogen-rich stream is supplied to a fuel cell stack 112 for producing an electric current to power an external electric mechanism, such as an electric motor (not shown).

The fuel cell system 110 includes a fuel tank 114 that supplies the hydrocarbon fuel and/or a water tank 116 for supplying water. The hydrocarbon fuel is supplied from the fuel tank 114 to an ATR (auto-thermal reactor) 122. As discussed in further detail below, an auto-thermal reformer 122 is provided and enables catalytic reformation of the hydrocarbon fuel to the hydrogen-rich stream during normal operation of the fuel cell system 110, after the start-up period. The vaporizer 118 is a combination multi-stage vaporizer and preferential oxidization (PrOx) reactor enabling rapid vaporization of water from tank 116 for introduction into the fuel cell system 110 in a gaseous state. In an alternative embodiment, separate vaporizers 118 are used, one for fuel and one for air.

Figure 6:
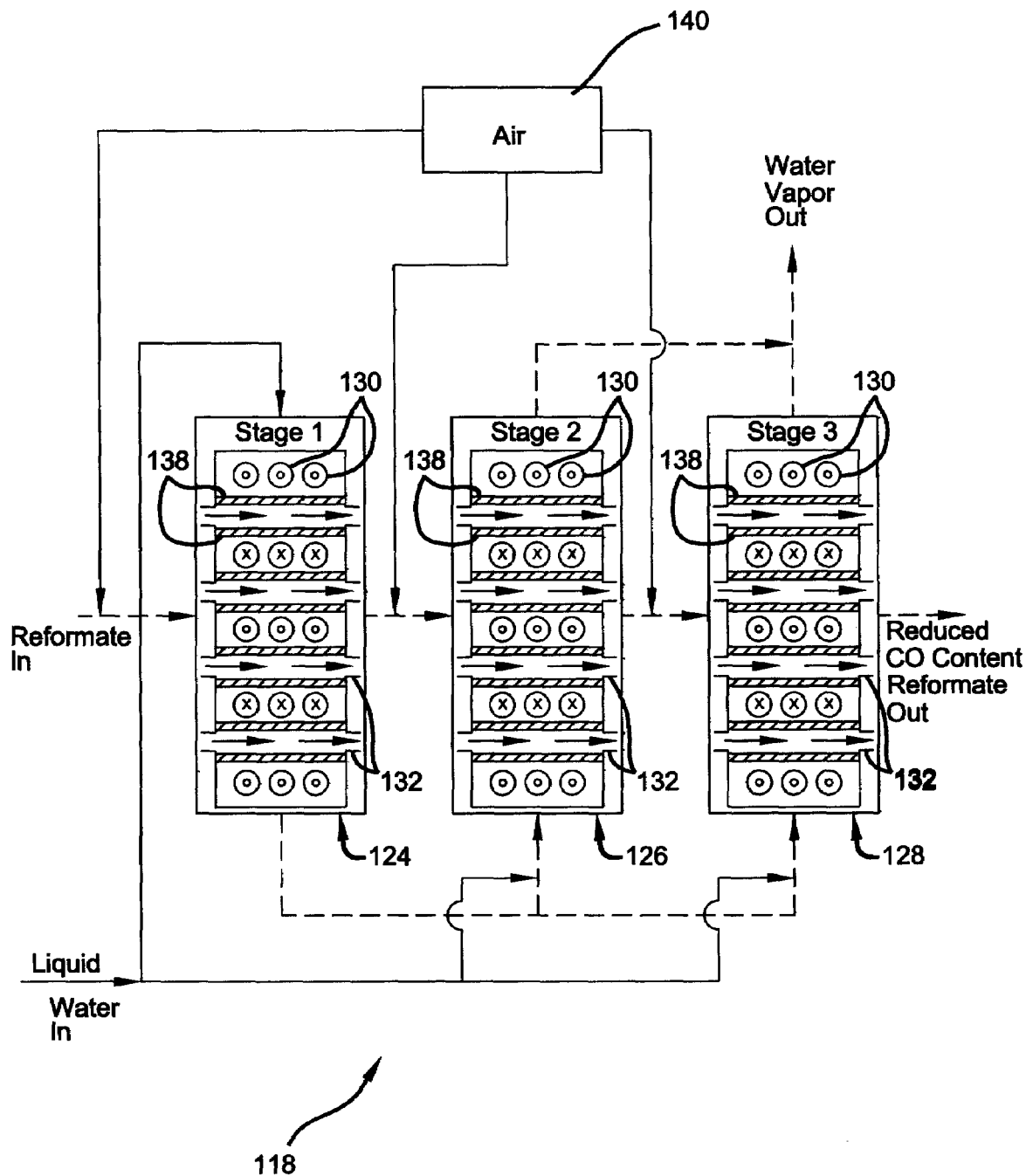
FIG. 6 is a schematic view of the combination multi-stage vaporization apparatus and preferential oxidization reactor.

With particular reference to FIG. 6, the vaporizer 118 will be described in detail. As discussed above, the vaporizer is-a combination multi-stage vaporizer and PrOx reactor having first, second and third heat exchange: stages, 124, 126, 128, respectively. Each stage of the vaporizer 118 is in the form of a heat exchanger and includes a plurality of first flow channels (or passages) 130 and a second plurality of flow channels (or passages) 132. The first plurality of flow channels 130 and the second plurality of flow channels 132 are adjacent to one another and are in heat exchange relationship. Generally, the first plurality of flow channels 130 function similarly to the grooves 38 of the vaporizer 16 for vaporizing liquid, as detailed hereinabove. However, instead of using heat from the combustor exhaust gases for vaporization, the first plurality of flow channels 130 use heat provided by exothermic PrOx reactions occurring within the adjacent second plurality of flow channels (or PrOx flow channels) 132. To enable the PrOx reactions, the PrOx flow channels 132 each include a catalyst layer 138, suitable for promoting the PrOx reactions. The PrOx reactions enable reduction in the CO content of the reformate stream supplied from the auto-thermal reformer 122 via the WGS 121. The CO is oxidized within the PrOx flow channels 132 by air, in the presence of $H_2$, without consuming a significant quantity of $H_2$. The PrOx reaction is provided as: $CO + \frac{1}{2}O_2 \rightarrow CO_2$. In the PrOx flow channels 132, it is preferred to control the temperature therein to minimize temperature rise during oxidization of the CO. This requires temperature control to avoid a significant increase in temperature, whereby an undesired reverse-water-gas-shift (RWGS) reaction may occur. Thus, the heat required to be removed from the PrOx flow channels 132 is used to heat liquid flowing through the first plurality of flow channels 132 to form a vapor.

An inlet of the first plurality of flow channels 130 of the first stage 124 are in fluid communication with the fuel and/or water tanks 114, 116 for receiving a flow of one of the fuel and water. An outlet of the first plurality of flow channels 130 of the first stage 124 is in parallel fluid communication with each of the second and third stages 126, 128. That is, the outlet of the first plurality of flow channels 130 of the first stage 124 provides a split flow path, whereby the fluid exiting the first plurality of flow channels 130 of the first stage 124 is split and supplied in parallel to the first plurality of flow channels 130 of the second and third stages 126, 128. Additionally, the second and third stages 126, 128 are each independently in fluid communication with the fuel and/or water tanks 114, 116.

The PrOx flow channels 132 of the first stage 124 are further in fluid communication with the auto-thermal reformer 122 via the WGS 121, for receiving a reformate flow therefrom and is in series fluid communication with the PrOx flow channels 132 of the second and third stages 126, 128 for further supplying the reformate flow therethrough. In this manner, the reformate flow initially flows through the PrOx flow channels 132 of the first stage 124, then through the PrOx flow channels 132 of the second stage 126 and ultimately through the PrOx flow channels 132 of the third stage 128 to the fuel cell stack 112. A supply of air 140 is provided and is in fluid communication with the reformate flow paths of the first, second and third stages 124, 126, 128, for injecting a volume of air to provide the 02 required for reaction with the reformate flow within the respective PrOx flow channels 132.

In operation, the first, second and third stages 124, 126, 128 of the vaporizer 118 are preheated by a suitable means in order for the catalyst layers 138 to achieve an operating temperature for enabling the PrOx reaction. This is achievable in any one of a number of manners, including, but not limited to, providing an electric pre-heater therewithin or flowing hot combustion gases (supplied from the combustor 120) therethrough during an initial start-up period, or reformate. Once the catalyst layers 138 have achieved an operational temperature, liquid water is supplied to the first plurality of flow channels 130 of the first stage 124 and reformate and air are supplied to the PrOx flow channels 132 of the first stage 124. In the presence of the catalyst layers 138 of the PrOx flow channels 132, the PrOx reaction occurs therewithin, thereby generating heat. The generated heat is transferred to the liquid water flowing through the first plurality of flow channels 132 of the vaporizer section 130, thereby vaporizing the liquid water to produce a flow of steam. This thermal interaction between thee first plurality of flow channels 130 and PrOx flow channels 132 can be characterized in one of two manners: 1) the PrOx flow channels 132 providing heat to vaporize the liquid water to steam (vapor fraction<=100%); or 2) the liquid water in the first plurality of flow channels 130 cooling the PrOx reactions to control the temperature thereof, concurrently producing steam and preventing a RWGS reaction.

After undergoing the PrOx reaction within the first stage 124, the reformate stream is again injected with air and both flow into the PrOx flow channels 132 of the second stage 126 for again undergoing PrOx reactions. The steam produced in the first stage 124 is split at the outlet and is supplied to both the second and third stages 126, 128 in parallel, respectively as first and second carrier fluid flows. Additional liquid water is supplied to the first carrier fluid flow and both are supplied to the first plurality of flow channels 130 of the second stage 126. The PrOx reactions within the PrOx flow channels 132 of the second stage 126 provide heat for vaporizing the liquid water carried through the first plurality of flow channels 130 by the first carrier fluid. Thus, the carrier fluid is combined with the vaporized liquid water (i.e. additional steam).

After undergoing the PrOx reactions within the second stage 126, the reformate stream is again injected with air and both flow into the PrOx flow channels 132 of the third stage 128 for again undergoing PrOx reactions. Additional liquid water is supplied to the second carrier fluid flow and both are supplied to the first plurality of flow channels 130 of the third stage 128. The PrOx reactions within the PrOx flow channels 132 of the third stage 128 provide heat for vaporizing the liquid water carried through the first plurality of flow channels 130 by the second carrier fluid. Thus, the second carrier fluid is combined with the vaporized liquid water (i.e. additional steam). The steam streams exiting the second and third stages 126, 128 are combined and supplied to the auto-thermal reformer 122. In this embodiment, fuel is supplied directly to the inlet and is vaporized within the inlet of the auto-thermal reformer 122 for reformation therein. Further, the reformate stream, having a reduced CO content as a result of the series of PrOx reactions, is supplied to the fuel cell stack 112.

In summary, the configuration of the vaporizer 118 concurrently vaporizes the liquid fuel and/or water and treats the reformate stream for lowering the CO content thereof. This configuration optimizes the thermal characteristics, whereby the heat generated by the PrOx reactions is used to vaporize the fluid flows. In this manner, a more compact, dual functioning unit is provided, which reduces overall component count and packaging requirements. It will be appreciated, however, that the multi-stage vaporizer 16 may be similarly constructed as the vaporizer 118. Thus, it is anticipated that the multi-stage vaporizer 16 may optionally include catalyst layers and receive a reformate stream to react with air for generating the vaporization heat.

In a further variation, air or other gas is injected into the fluid stream entering the vaporizer. Such injected air (see FIG. 2 and 140 of FIG. 5) serves as an initial carrier gas for distributing liquid on the heat transfer surface of the first heat exchanger section.

In still a further variation, the vaporized stream exiting the vaporizer is supplied to the stack to humidify the stack. As in FIG. 1, the water vapor exiting vaporizer 16 is injected into an air stream 150 before such air is supplied to the stack 12.

Those skilled in the art will appreciate that vaporizer 16 is arranged to provide heat transfer to a fluid stream in stages. The vaporizer illustrated herein is arranged with multiple sections so that fluid is injected into a downstream section for dispersing in a carrier supplied from an upstream section. The vaporizer may be monolithic and contain several heat exchange sections fabricated along a single heat exchanger core. Alternatively, it may be arranged as separate heat exchangers, with separate cores, each core corresponding to a separate heat exchange stage.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for reducing the carbon monoxide content of a gas stream while vaporizing liquid in a fluid stream comprising;
   a) providing a hydrocarbon reformer connected to a preferential oxidizer connected to a fuel cell stack constructed and arranged so that the reformer produces a gas stream comprising hydrogen and carbon monoxide and so that the gas stream flows from the reformer to the preferential oxidizer, the preferential oxidizer comprising at least a first stage and a second stage connected in series,
   b) providing a fluid stream which comprises liquid;
   c) in the first stage reacting a portion of said carbon monoxide with a first stream of oxygen to reduce the contact of carbon monoxide in the gas stream in a exothermic reaction while transferring heat from the exothermic reaction to said liquid in said fluid stream to vaporize said liquid and provide a vaporized fluid stream, while maintaining said fluid stream and said gas stream separate from one another;
   d) adding liquid to said vaporized fluid stream;
   e) in the second stage reacting another portion of carbon monoxide in said gas stream with a second stream of oxygen to further reduce the content of carbon monoxide in the gas stream in an exothermic reaction while transferring heat from the exothermic reaction to said fluid stream to vaporize said added liquid, while maintaining said fluid stream and said gas stream separate from one another, and flowing a preferential oxidizer exhaust stream comprising hydrogen from the preferential oxidizer directly to the fuel cell stack and flowing vaporized fluid from the preferential oxidizer to the reformer.

2. The method of claim 1 wherein steps (d) and (e) are repeated in sequence.

3. The method of claim 1 wherein step (e) is conducted in a heat exchanger having a surface in contact with said fluid stream in wherein said vaporized fluid distributes said added liquid along said heat exchanger surface for vaporization thereon.

* * * * *